Sept. 27, 1966 H. S. CRAFTS 3,276,001

MAGNETIC ANALOG DEVICE

Filed Feb. 8, 1963 2 Sheets-Sheet 1

INVENTOR.
HAROLD S. CRAFTS
BY Samuel Lindenberg
ATTORNEY

HAROLD S. CRAFTS
INVENTOR.

BY Samuel Lindenberg
ATTORNEY

United States Patent Office 3,276,001

Patented Sept. 27, 1966

3,276,001

MAGNETIC ANALOG DEVICE

Harold S. Crafts, Palo Alto, Calif., assignor to Research Corporation, New York, N.Y., a corporation of New York Filed Feb. 8, 1963, Ser. No. 257,203
18 Claims. (Cl. 340—174)

This invention relates to magnetic analog devices and more particularly to improvements therein.

The use of magnetic cores for the purpose of either analog or digital storage is quite well known. A magnetic core which is used for analog storage usually is driven to a state of magnetic remanence representative of the driving current or the integral of the driving current pulse increments. Then in order to read out of the core the analog quantity stored therein, it is necessary to drive the core to induce a voltage in an output winding which represents the quantity stored in the core. The process of readout destroys the information stored in the core. In order to restore this information auxiliary equipment must be used which measures the amplitude of the signal which has been read out and drives the core back to its previous state of remanence. Due to hysteresis characteristics this is not simple to do.

An object of this invention is to provide an analog storage device having nondestructive readout.

Another object of this invention is to provide an analog storage device wherein the information stored in said core is continuously available.

Yet another object of the present invention is the provision of an analog storage device with nondestructive readout which is simpler to operate than devices of this type known in the prior art.

Yet another object of the present invention is the provision of a novel and useful analog storage device with nondestructive readout.

Still another object of this invention is to provide a unique device capable of use in the performance of logic.

These and other objects of the invention may be achieved in an arrangement comprising a magnetic means which has a substantially zero flux state and remanent flux states which exist on either side of said zero flux state. A winding is provided coupled to said magnetic means for applying an excitation thereto having a predetermined fundamental oscillation frequency and an amplitude which is less than that required to alter the remanent flux state of the magnetic means. Another winding is provided which is coupled to the magnetic means in a manner so that the application of a direct current to this winding can place the magnetic means in a predetermined remanent flux state. Further, the winding is so coupled to the magnetic means in a manner so that on this winding there exists a signal which has a different frequency than the frequency of the fundamental oscillation. This signal also has an amplitude and phase which are representative of the location of the predetermined remanent flux state of the magnetic means with respect to the zero flux state.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
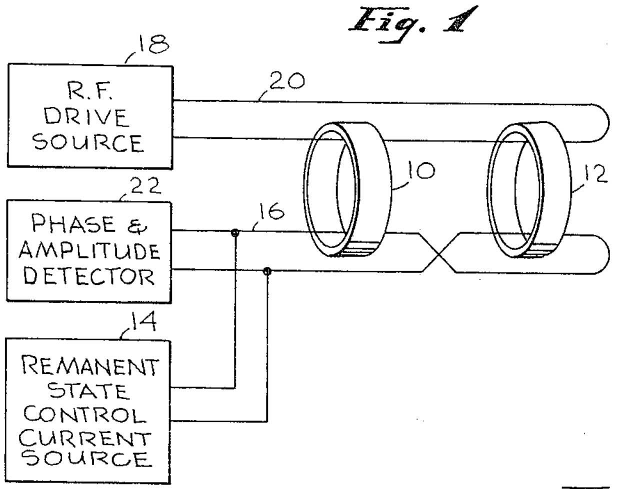
FIGURE 1 is a schematic diagram of an embodiment of the invention.

Reference is now made to FIGURE 1 which is a schematic diagram of an embodiment of the invention. This includes a pair of magnetic cores 10, 12, which preferably are of the type known as tape wound cores. These cores will have the well-known magnetic characteristics in which the cores will have a zero remanent flux state and opposite remanent flux states existing on either side of the zero remanent flux state. The cores can be driven to a predetermined one of these remanent flux states by the application of a current from a remanent state control current source 14 to a winding 16. The winding 16 is inductively coupled to the cores 10 and 12 but with a relatively opposite coupling sense. The winding 16 will hereafter be called the "output" winding. Thus, when current from the source 14 is applied to winding 16, cores 10 and 12 are driven with relatively opposite senses to opposite states of magnetic remanence or to relatively positive and negative states of remanence.

The cores 10 and 12 are driven with an RF drive current which is obtained from the RF drive source 18. The RF drive current has a predetermined oscillation frequency, which by way of example, may be 100 kc. per second. The output of the RF drive source 18 is applied to a drive winding 20 which is inductively coupled to both of the cores 10, 12 with the same coupling sense.

The output winding 16 is arranged so that the fundamental component of the RF voltage induced in it cancels out, leaving a second harmonic distortion voltage proportional to the remanent flux in the cores 10, 12. A phase and amplitude detector 22, is connected to the output winding 16 in order to detect the second harmonic distortion voltage. The amplitude of the excitation by the RF drive source 18, should be less than the amount required to vary the remanent flux state of the cores and yet should not be so low that the second harmonic distortion voltage which is induced in the winding 16 is not detectable.

The remanent flux level of the cores can be readily altered by passing a direct current from the remanent state control current source 14 through the output winding 16. Due to an interaction between this current and the RF drive current, the time rate of change of the remanent flux with respect to the current applied from the remanent state control current source is quite constant and reversible, thus providing a smoothly variable change in the remanent flux state of the cores. The second harmonic distortion voltage detected by the phase and amplitude detector is not only proportional in amplitude to the amount of remanent flux in the cores, but its phase indicates on which side of zero remanent flux the remanent flux state of the cores exists.

The second harmonic output voltage characteristic of the cores can be explained on the basis of a simple model of a core such as is shown in FIGURE 1. In a square loop magnetic characteristic material, the magnetic domains are oriented along the direction of the tape. The domains may be oriented in either of two opposing directions. The flux density in the domains is essentially constant, and the remanent state of the core can be defined by the net flux, which is simply the difference between the fluxes in the oppositely directed domains. Since the flux density is constant in a particular domain area this amounts to defining the remanent state of the core as the difference in the domain areas through the cross section of the core. The output voltage then becomes the difference between the effect of the drive current on the oppositely directed domains. The second harmonic output voltage will be at maximum, therefore, when the core is saturated and it consists of a single domain oriented in one direction. When domains oriented in opposite directions have equal area, the output voltage will be zero. As the net magnetization of the core decreases from the maximum, goes through zero and increases to a maximum again in the opposite direction, the output voltage will likewise decrease from a maximum, change its phase by 180° as it goes through zero, and increase to a maximum. Hence, the state of the core may be sensed nondestructively with the second harmonic distortion voltage. If two cores are used, the fundamental voltage component can be canceled out by the manner of the coupling to the cores of the output winding, leaving only the second harmonic voltage in the output.

The sinusoidal RF drive current produces two effects which are essential to the operation of the device. The first effect is the nondestructive readout which has already been discussed. The other effect is equally important. Due to the presence of the drive current, the apparent coercive force of the core is greatly reduced. As a result, undesirable effects due to the coercive forces of the cores are reduced. Also, a smooth transition between remanent states can occur.

If a constant current exceeding the switching threshold is applied to the output winding from the source 14, the remanent state of the cores will be changed. The change is probably due to magnetic flux being switched by the irreversible domain wall movement. The domain wall movement is sensed by a change in the second harmonic output voltage. The rate of magnetic flux switching is proportional to the difference between the switching current in the output winding and the current threshold. Since the threshold is approximately constant, the remanent state of the cores will change at a fairly constant rate.

A voltage will be developed across the output winding proportional to the rate at which flux is being switched in the cores by the current from the source 14. This voltage has no effect on the current source. However, if a shorted winding is placed in parallel with the output winding the voltage induced in this winding can produce a feedback current proportional to the rate at which the remanent state of the core is being switched, which opposes the switching current. Then, if the rate of change of the remanent state is made to decrease due to an increase in the threshold, the feedback current likewise decreases, and the magnetizing force applied to the core would increase to overcome the increase in the threshold. Thus the linearity of the rate of change in remanent state characteristic can be improved with feedback at the expense of a corresponding increase in the switching current.

Figure 2:
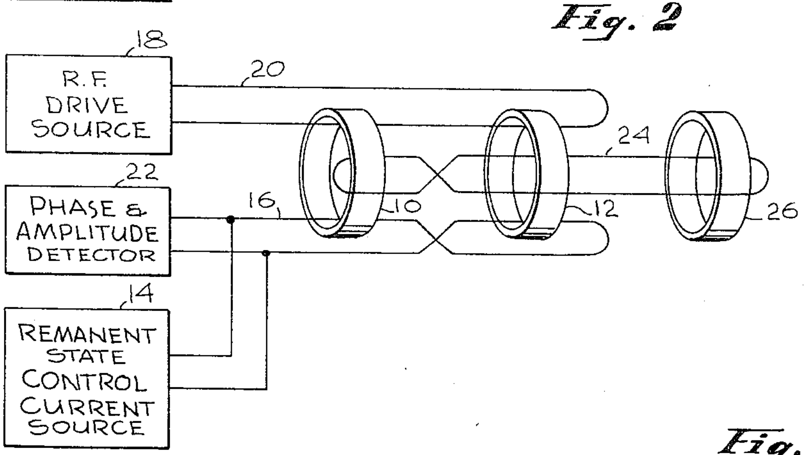
FIGURE 2 is a schematic diagram of an embodiment of the invention using feedback.

FIGURE 2 shows such a feedback winding 24. This feedback winding is a closed loop winding which is parallel to the output winding 16 and is inductively coupled on the cores 10, 12 in the same manner as is the output winding 16. If the feedback winding 24 were closed on itself so that it was shorted, it would obviously reduce the output voltage greatly, since it is in parallel with the output winding. However, to avoid this a small inductance is provided by the expedient of another magnetic core 26, to which the winding 24 is coupled. By choosing the value of such inductance, such that the output voltage is not too severely reduced, while still maintaining essentially a shorted turn at D.C. there is an improvement in the linearity of the operation of the system.

One precaution must be taken with the feedback winding. This winding now links a core to avoid shorting out the output voltage. If too many turns are placed on this auxiliary core 26, the resultant magnetizing force will be sufficient to switch considerable flux in this core, and a voltage will appear across the winding which will oppose the feedback current. If this happens, there is nothing to oppose the switching current, and the other cores will switch very rapidly until the feedback core 26 saturates. In other words, due to the transformer coupling, one sees the feedback core when looking into the output winding and care must be taken so that it looks like a short circuit to the switching current.

In order for the feedback scheme to work the ratio of the feedback voltage to the switching current must be large, and since this ratio is proportional to the maximum permeability, a large maximum permeability is desired. For this reason, tape wound cores are preferred for use as the core pair 10, 12, instead of square loop ferrite cores. However, a linear ferrite toroid core may be used as the feedback core.

As a specific example of an operative embodiment of the invention, but not to serve as a limitation upon the invention, the cores chosen for said embodiment of the invention had the following parameters:

| | |
|---|---|
| Material | Orthonol, a nickel-iron alloy produced by Magnetics, Inc. |
| Core diameter | 0.313 in. |
| Tape width | 0.125 in. |
| Tape thickness | 0.001 in. |
| No. of turns of tape on core | 20. |
| Flux capacity | 400 maxwells. |

The drive winding was a single turn. The output winding was 60 turns, center tapped. The feedback winding was five turns on the harmonic generator cores and three turns on the feedback core. The feedback core had the following parameters:

| | |
|---|---|
| Material | T–1 ferrite from General Ceramics, Inc. |
| Core ID | 0.187 in. |
| Core OD | 0.375 in. |
| Core height | 0.125 in. |

An RF drive signal of 100 kc. per second with an amplitude of 85-mv. R.M.S. was applied to the drive winding 20. The maximum output voltage was on the order of 100 mv. R.M.S.

Figure 3:
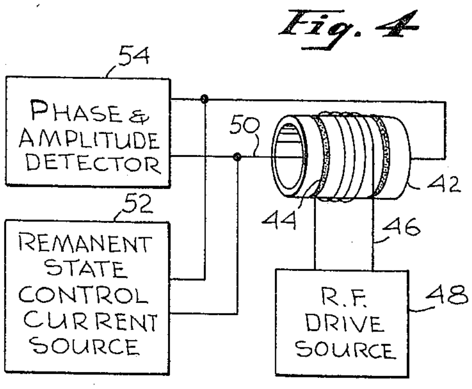
FIGURE 3 is a schematic diagram of another embodiment of the invention.

Another embodiment of the invention is shown in FIGURE 3. It has been found that when current from an RF drive source 30 is applied to a drive winding 32 which is wound around the cylindrical surface of a toroidal magnetic core 34, then a second harmonic distortion voltage is induced in an output winding 36, which passes through the axis of the core 34. The relationship of this second harmonic voltage with respect to the remanent state of the core 34, is substantially identical with that described in connection with the embodiment of the invention shown in FIGURES 1 and 2. The state of remanence of the core 34 can be altered by the application of current from the remanent state control current source 38 to the output winding 36. A phase and amplitude detector 40, which is connected to this output winding may be used to detect the second harmonic distortion voltage.

The drive current from the RF drive source flows in a manner to establish a field which is orthogonal to the winding 36 and therefore no fundamental frequency component is induced therein. However, it has been found there is a second harmonic frequency component induced in said winding which represents in amplitude and phase the relationship of the state of magnetic remanence of the core 34 with respect to the zero magnetic state.

Figure 4:
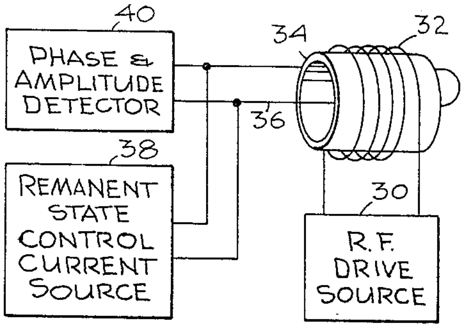
FIGURE 4 is a schematic diagram of another variation of the embodiment of the invention shown in FIGURE 3.

The embodiment of the invention may also be formed in the manner shown in FIGURE 4. A nonmagnetic substrate 42, such as glass, has deposited thereon, a thin film of square loop magnetic material 44. This material is deposited so that the easy direction of magnetization is around the substrate. The drive winding 46 is wound around the magnetic film deposit in the manner shown. An RF current is applied from the drive source 48. The output winding 50 passes through the center of the cylindrical substrate. The remanent state of the magnetic material is controlled by a current from the remanent state control current source 52. The remanent state of the material is detected by a phase and amplitude detecting circuit 54. The use of the thin film for the magnetic core increases the switching speed therefore the system may be operated at a higher frequency than with cores made in the usual manner.

Figures 5, 6:
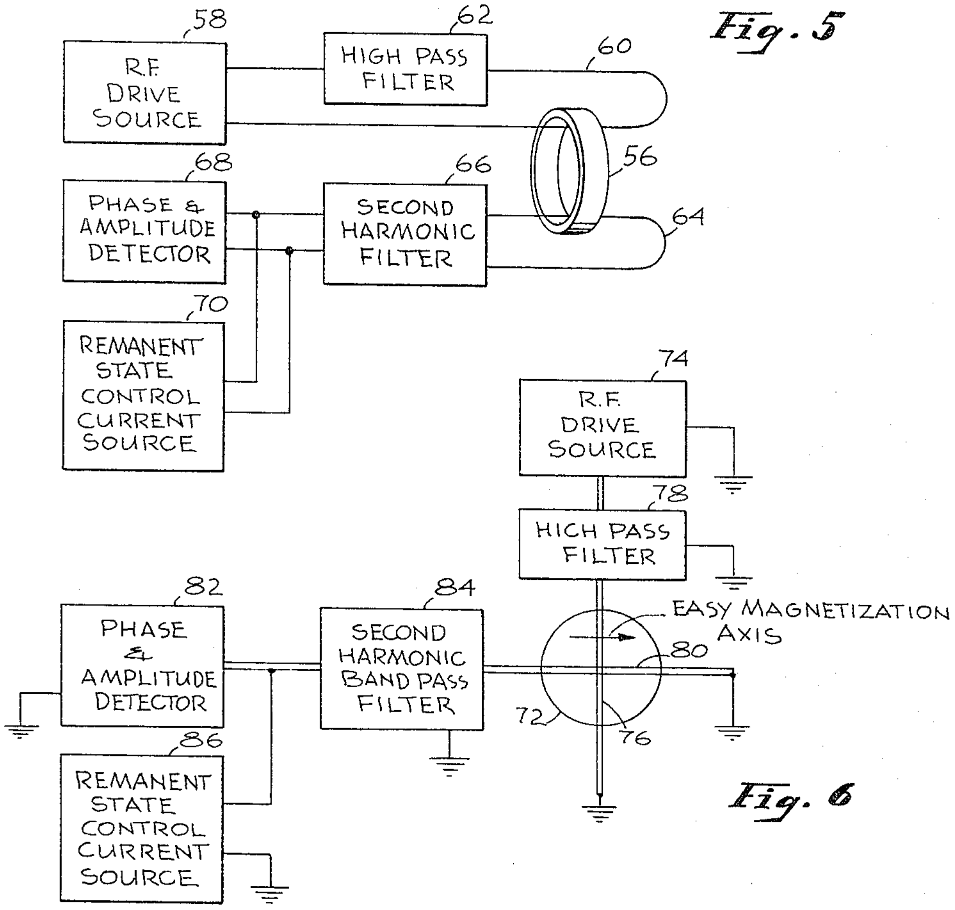
FIGURE 5 shows a schematic diagram of an embodiment of the invention using a single magnetic core.
FIGURE 6 shows a schematic diagram of an embodiment of the invention employing a magnetic film deposited as a spot.

FIGURE 5 shows another arrangement for the embodiment of the invention using a single magnetic core 56. An RF drive source 58 applies a drive current at a suitable fundamental frequency to the drive winding 60 through a high pass filter 62. The drive winding is inductively coupled to the core 56. An output winding 64 is also coupled to the core 56. This winding is connected to a second harmonic bandpass filter 66, which passes only the second harmonic and not the fundamental frequency. The output from the second harmonic bandpass filter 56 is applied to a phase and amplitude detector circuit 68 which provides an output having an amplitude determined by the remanent state of the magnetic core 56 and a polarity determined by location of the remanent state of the core with respect to the zero remanent state of the core.

The remanent state of the magnetic core 56 may be established, as previously described, by the current applied to the output winding from a remanent state control current source. In view of the fact that there is no balancing out of the fundamental frequency which is induced in the output winding along with the second harmonic frequency, it is necessary to use the second harmonic bandpass filter for eliminating the fundamental frequency from the output. Otherwise, the system shown in FIGURE 5 operates in the same manner as those previously described.

FIGURE 6 illustrates an embodiment of the invention utilizing a single thin magnetic film spot 72 deposited on a substrate not shown. The RF drive source 74 applies a drive signal at a fundamental frequency to the drive line 76 through a high pass filter 78. The drive line is positioned above the magnetic film at right angles to the axis of easy magnetization, the direction of which is represented by the arrow. The output winding 80 also is positioned above the magnetic film and is oriented at right angles with respect to the drive winding and is parallel to the easy magnetization axis. The output winding in connected to the phase and amplitude detector 82 through a second harmonic bandpass filter 84. The state of remanence of the thin film magnetic spot is determined by the current applied to the output winding by the remanent state control current source 86.

Figure 7:
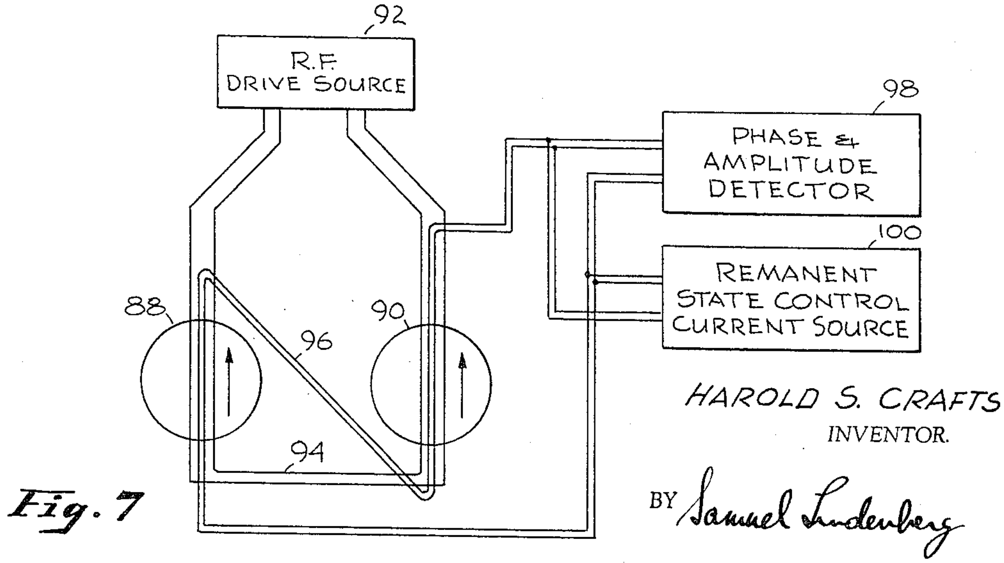
FIGURE 7 shows a schematic diagram of an embodiment of the invention using two magnetic film spots.

FIGURE 7 shows an embodiment of the invention utilizing two thin magnetic film spots respectively 88, 90, deposited on a substrate, not shown. The RF drive source 92 applies a fundamental frequency drive signal to a drive winding 94 which extends from the RF source next to the magnetic spot 88 parallel to the easy magnetization axis and then returns to the RF drive source passing next to the magnetic spot 90 also parallel to the easy magnetization axis. An output winding 96 extends from a phase and amplitude detector 98 to also couple to the two thin film spots at the same region as does the drive winding but with the same relative coupling sense, whereas the drive winding is coupled to the two thin film spots with relatively opposite coupling sense. The result however, is the same. The fundamental frequency is canceled out in the drive winding and only the second harmonic frequency is left. Its amplitude and phase are determined by the state of magnetic remanence of the two thin film magnetic spots. The remanent state current control source 100 provides the direct current or D.C. pulse whereby the two thin film spots are positioned in a desired state of magnetic remanence.

While this invention has been described as an analog storage device with nondestructive readout, this is by way of illustration and not by way of limitation of the utility of the invention. For example, this invention may be used as a component in adaptive logic circuits since it provides both variable gain and memory and it is reversible. Thus by the expedient of adjusting its output via feedback to have a desired value in response to varying the state of remanence of the magnetic means employed (core or film), the output can be subsequently used for comparison to determine whether the desired value has again occurred. Alternatively, the current increments required to drive the magnetic means to a required state of remanence as indicated by the output may be used for logic purposes.

The rectangles herein which are labeled RF drive source, phase and amplitude detector, and remanent state control current source, etc. represent well know circuitry in this art and therefore need not be described herein. The remanent state control current source should be a reversible current source in order to drive the storage cores reversibly. The cores will attain a state of remanence as determined by the amplitude and duration of the current applied to the output winding and also by the state of remanence which the cores being driven by said current have at the time, the remanent state altering current is applied to them. The exception to this of course, is if the current being applied is sufficiently large to drive the cores into a state of saturation then the previous state of remanence of the cores does not have any bearing on the resultant remanent state. The state of remanence of the cores is continuously indicated by the output of the phase and amplitude detector.

There has accordingly been shown and described herein a novel, useful and improved magnetic device whereby the state of remanence of the magnetic device may be altered if desired and the state of remanence may also be continuously indicated without the state of remanence being altered to provide such indication.

I claim:

1. A magnetic device comprising magnetic means having a substantially zero flux state and a plurality of opposite remanent flux states on either side of said zero flux state, first winding means coupled to said magnetic means for placing it in a predetermined one of said plurality of opposite remanent flux states, second winding means for applying an excitation to said magnetic means having a predetermined fundamental oscillation frequency and having an amplitude less than that required to alter the remanent flux state of said magnetic means, and detector means coupled to said second winding means and solely responsive to excitation applied by said means for applying excitation for detecting a signal having a different frequency than said fundamental oscillation frequency and having an amplitude and phase representative of the location of said predetermined remanent flux state with respect to said zero flux state.

2. A magnetic device as recited in claim 1 wherein said second winding means is a winding which is wound around the periphery of said toroid to establish a cylindrical winding with its axis concentric with that of said toroidal core, and said first winding means is a winding which extends through the central aperture of said toroid parallel to the axis thereof.

3. A magnetic device as recited in claim 1 wherein both said first and said second winding means are winding which are wound around the toroidal magnetic core passing through the central aperture thereof.

4. A magnetic device as recited in claim 1 wherein said magnetic device comprises a thin film of magnetic material having an axis of easy magnetization, said first winding means coupled to said magnetic means for placing it in a desired one of said remanent flux states includes a wire extending proximal to said thin film of magnetic material parallel to the direction of said axis of easy magnetization, said second winding means for applying an excitation to said magnetic means having a predetermined fundamental oscillation frequency includes a wire extending proximal to said thin film of magnetic material and at right angles to said axis of easy magnetization.

5. A magnetic device as recited in claim 1 wherein said magnetic device comprises a first and second thin film of magnetic material each having an axis of easy magnetization, said first winding means coupled to said magnetic means for placing it in a desired one of said remanent flux states includes a wire extending adjacent to said first and second thin films of magnetic material, parallel the axis of easy magnetization and with the same relative coupling sense to both thin films, said second winding means for applying an excitation to said magnetic means having a predetermined fundamental frequency includes a wire extending adjacent to said first and second thin films of magnetic material, parallel to the axis of easy magnetization and with an opposite relative coupling sense to both thin films.

6. A magnetic device comprising magnetic means having a substantially zero flux state and a plurality of opposite remanent flux states on either side of said zero flux state, a first winding means inductively coupled to said magnetic means, means for applying an excitation to said first winding means having a predetermined fundamental oscillation frequency and having an amplitude less than that required to alter the remanent flux state of said magnetic means, a second winding means inductively coupled to said magnetic means, means for applying electrical current to said second winding means to place said magnetic means in a predetermined one of said plurality of remanent flux states, and means solely responsive to excitation applied by said first winding means for deriving from said second winding means a signal having a different frequency than said fundamental oscillation frequency and having an amplitude and phase representative of the location of said predetermined remanent flux state with respect to said zero flux state.

7. A magnetic device as recited in claim 6 wherein said magnetic means comprises a body of magnetic material having a central aperture, said first winding is wound around the periphery thereof, and said second winding extends through the central aperture thereof.

8. A magnetic device as recited in claim 7 wherein said body of magnetic material comprises a ring of magnetic material deposited as a thin film on a circular nonmagnetic substrate.

9. A magnetic device as recited in claim 6 wherein said magnetic means comprises a pair of magnetic cores, said first winding is inductively coupled to said pair of magnetic cores with the same coupling sense, and said second winding is inductively coupled to said pair of magnetic cores with a relatively opposite coupling sense.

10. A magnetic device as recited in claim 6 wherein said magnetic means comprises first, second and third magnetic cores, said first winding is inductively coupled to said first and second magnetic cores with the same coupling sense, said second winding is inductively coupled to said first and second cores with a relatively opposite coupling sense, and a third winding is inductively coupled to said third magnetic core and to said first and second magnetic cores with a relatively opposite coupling sense.

11. A magnetic device comprising a pair of magnetic cores each having a substantially toroidal shape, each having a substantially zero flux state and opposite remanent flux state on either side of said zero flux state, a first winding inductively coupled to said pair of cores with the same coupling sense, means for applying an excitation to said first winding having a predetermined fundamental oscillation frequency and an amplitude less than that required to alter the remanent flux state of said pair of magnetic cores, a second winding inductively coupled to said pair of magnetic cores with a relatively opposite sense, means for applying current to said second winding for placing said pair of cores in a predetermined remanent state, and means for deriving from said second winding a signal having a frequency which is twice the predetermined fundamental oscillation frequency and having an amplitude and phase representative of the location of said predetermined flux state relative to said zero flux state.

12. A magnetic device as recited in claim 11 wherein there is included feedback means between said pair of cores, for linearizing the effects of said means for applying excitation on said first pair of cores.

13. A magnetic device as recited in claim 12 wherein said feedback means comprises a closed winding inductively coupled to said pair of cores with a relatively opposite sense, and a third magnetic core to which said closed winding is inductively coupled.

14. A magnetic device comprising a magnetic core having a substantially ring shape with a central aperture, said core having a substantially zero flux state and opposite remanent flux states on either side of said zero flux state, a first winding wound around the periphery of said magnetic core to define a cylindrical shape substantially concentric with said core ring shape means for applying an excitation to said first winding having a predetermined oscillation frequency and an amplitude less than that required to alter the remanent flux state of said pair of magnetic cores, a second winding extending along the axis and through the central aperture of said core, means for applying current to said second winding for placing said core in a predetermined remanent state, and means for deriving from said second winding a signal having a frequency which is twice the predetermined fundamental oscillation frequency and having an amplitude and phase representative of the location of said predetermined flux state relative to said zero flux state.

15. A magnetic device as recited in claim 9 wherein said core comprises a cylindrical substrate, and a magnetic material film deposited as a ring around said cylindrical substrate.

16. A magnetic device comprising a magnetic core having a substantially ring shape with a central aperture, said core having a substantially zero flux state and opposite remanent flux states on either side of said zero flux state, a first winding wound on said magnetic core, means for applying an excitation to said first winding having a predetermined oscillation frequency and an amplitude less than that required to alter the remanent flux state of said pair of magnetic cores, a second winding wound on said magnetic core, means for applying current to said second winding for placing said core in a predetermined remanent state, and means for deriving from said second winding a signal having a frequency which is twice the predetermined fundamental oscillation frequency and having an amplitude and phase representative of the location of said predetermined flux state relative to said zero flux state.

17. A magnetic device comprising a thin film of magnetic material having an easy axis of magnetization and having a substantially zero flux state and opposite remanent flux states on either side of said zero flux state, a drive winding comprising a wire extending adjacent to said thin film at right angles to the easy axis of magnetization, an output winding comprising a wire extending adjacent to said thin film parallel to the axis of easy magnetization, means for applying an excitation to said drive winding having a predetermined oscillation frequency and an amplitude less than that required to alter the remanent flux state of said thin film of magnetic material, means for applying current to said output winding for placing said thin film in a predetermined remanent state, and means for deriving from said output winding a signal having a frequency which is twice the predetermined fundamental oscillation frequency and which has an amplitude and phase representation of the location of said predetermined flux state relative to said zero flux state.

18. A magnetic device comprising a first and a second thin film of magnetic material, both said films having an easy axis of magnetization and having a substantially zero remanent flux state and opposite remanent flux states on either side of said zero remanent flux state, a drive winding coupled to said first and second thin films comprising a wire extending adjacent said first thin film along its easy axis of magnetization and then extending further adjacent said second thin film along its easy axis of magnetization, the inductive coupling sense of said wire to said first and second thin films being relatively opposite, a drive winding coupled to said first and second thin films comprising a wire extending adjacent said first and second thin films along their easy axis of magnetization and with relatively the same inductive coupling sense, means for applying an excitation to said drive winding having a predetermined oscillation frequency and an amplitude less than that required to alter the remanent flux state of said first and second thin films of magnetic material, means for applying current to said output winding for placing said first and second thin film in a predetermined remanent state, and means for deriving from said output winding a signal which is twice the predetermined fundamental oscillation frequency and which has an amplitude and phase representative of the location of said predetermined flux state relative to said zero flux state.

References Cited by the Examiner

UNITED STATES PATENTS

| | | | |
|---|---|---|---|
| 3,008,054 | 11/1961 | Saltz | 307—88 |
| 3,191,053 | 6/1965 | Oshima et al. | 307—88 |

BERNARD KONICK, *Primary Examiner.*

IRVING L. SRAGOW, *Examiner.*

S. M. URYNOWICZ, *Assistant Examiner.*